United States Patent [19]

Knoebel et al.

[11] 4,203,391
[45] May 20, 1980

[54] FLUIDIZED BED FUEL FEEDER

[75] Inventors: Paul S. Knoebel, Clinton; Jerald M. Wennerstrom, Canal Fulton, both of Ohio

[73] Assignee: The Babcock & Wilcox Company, New Orleans, La.

[21] Appl. No.: 929,862

[22] Filed: Jul. 31, 1978

[51] Int. Cl.² ............................................. F22B 1/02
[52] U.S. Cl. .................................. 122/4 D; 110/245; 431/170
[58] Field of Search ............... 122/4 D; 110/245, 263, 110/267; 431/7, 170; 432/58

[56] References Cited

U.S. PATENT DOCUMENTS

| 3,589,342 | 6/1971 | Barker et al. | 122/4 D |
| 3,736,908 | 6/1973 | Ehrlich et al. | 122/4 D |
| 3,799,747 | 3/1974 | Schmalfeld et al. | 110/245 |
| 3,902,462 | 9/1975 | Bryers | 122/4 D |

Primary Examiner—Edward G. Favors
Attorney, Agent, or Firm—Robert J. Edwards; Edward A. Steen; Stephen R. Doody

[57] ABSTRACT

An underfeed fuel feeder for introducing granular material into a fluidized bed. One embodiment introduces material into the bed through a perforated cavity-shaped feed nozzle disposed beneath an air distribution plate. A second embodiment introduces material through a T-shaped nozzle disposed above the plate. A housing protects the nozzle. A third embodiment depicts the nozzle-housing combination in a fluidized bed boiler employing water cooled floors.

3 Claims, 10 Drawing Figures

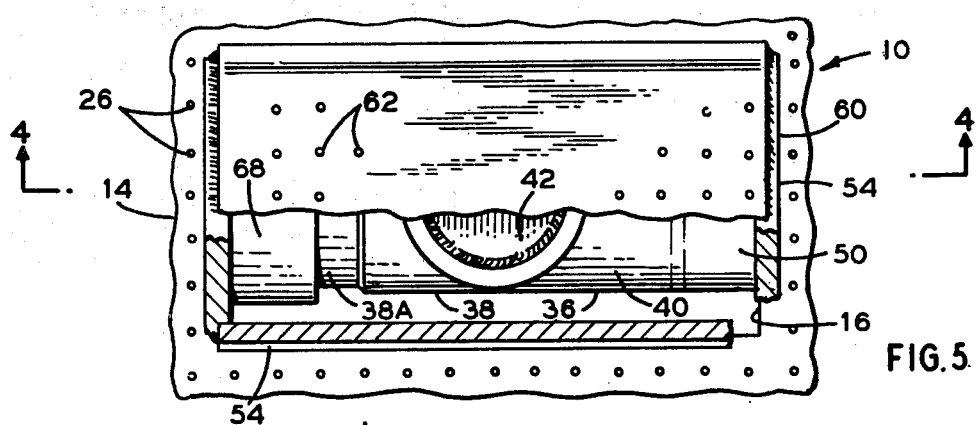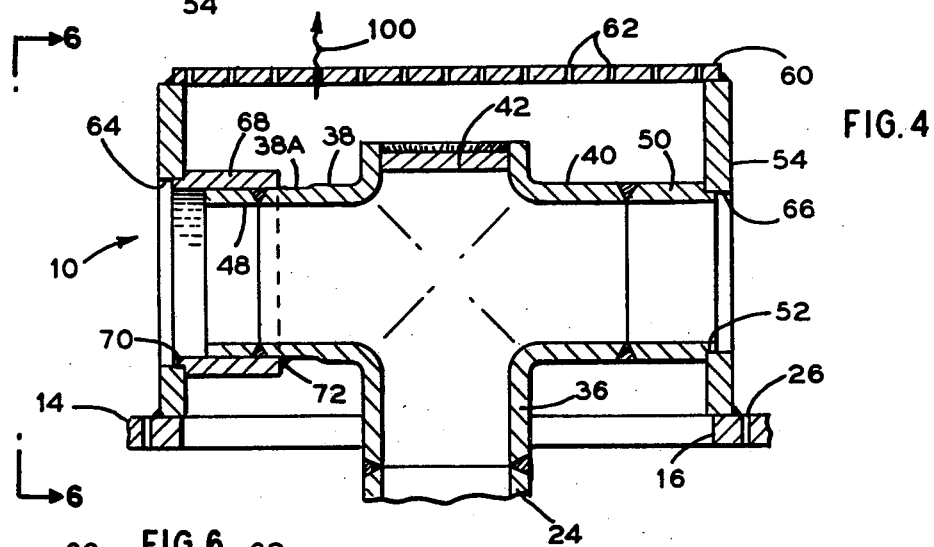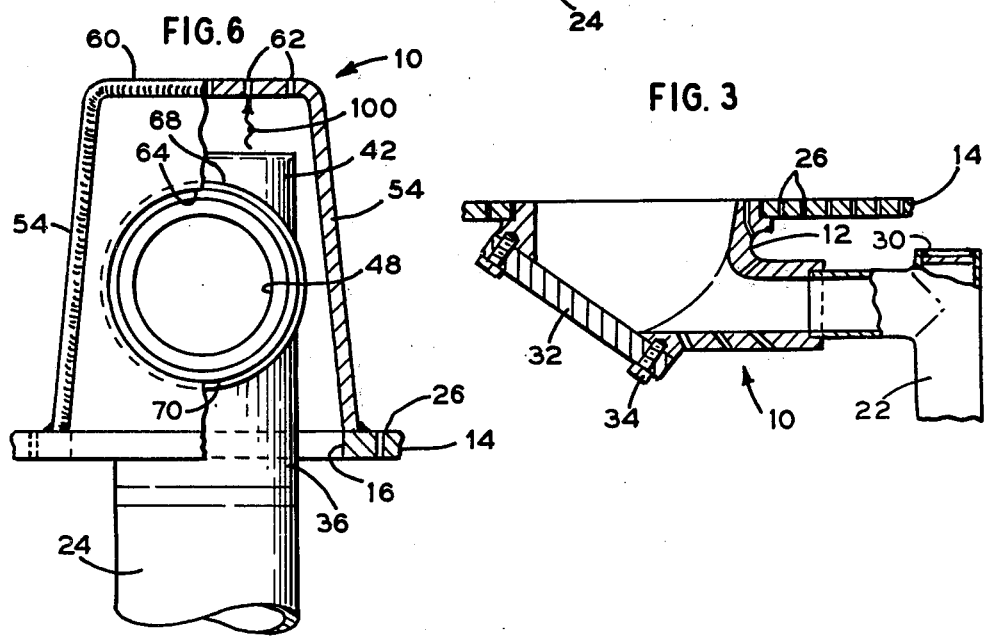

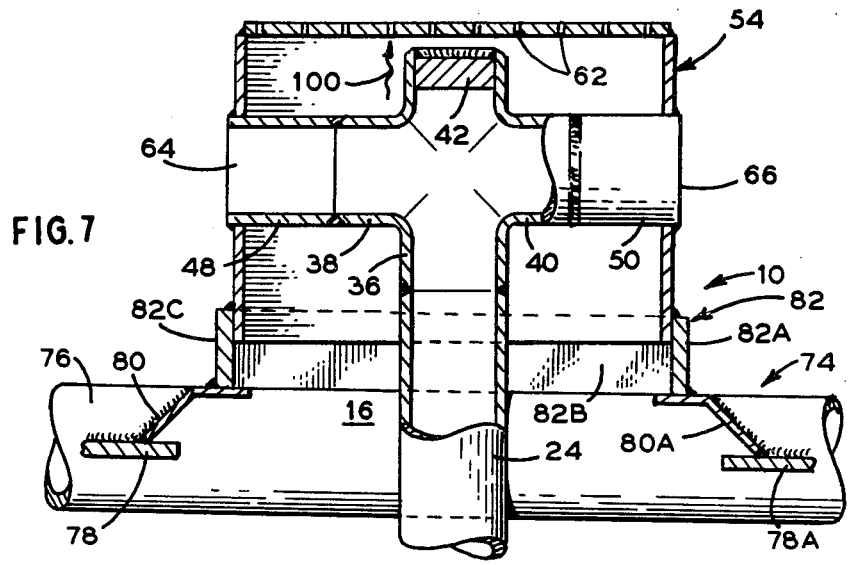
FIG. 7
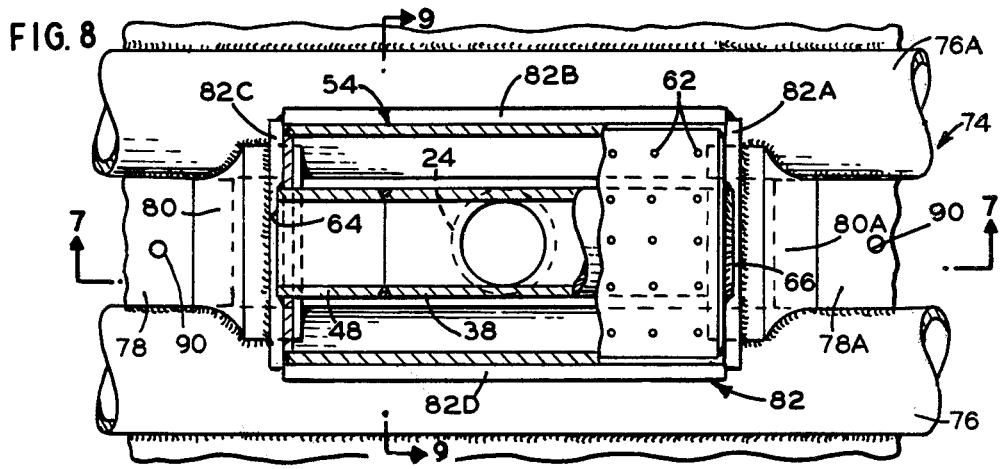
FIG. 8
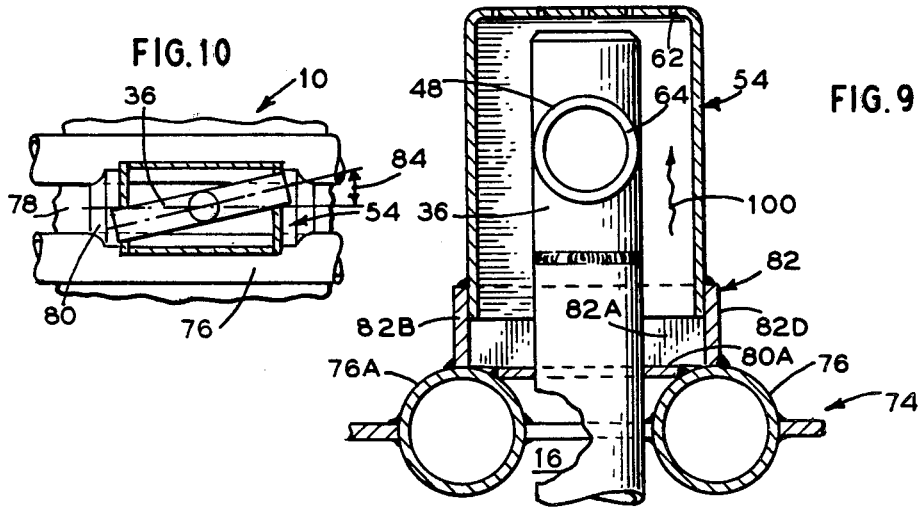
FIG. 10
FIG. 9

FLUIDIZED BED FUEL FEEDER

TECHNICAL FIELD

This invention relates to boiler fuel feeding in general and more specifically to an underfeed fluidized bed boiler fuel feeder.

BACKGROUND ART

In recognition of their inherently cleaner and potentially more efficient fuel burning properties, fluidized bed boilers are now seriously being considered as viable supplements to the traditional pulverized coal and stoker fired vapor generating units of today.

Briefly, a fluidized bed boiler burns granulated coal in a floating fluid-like suspension called a fluidized bed. In addition to the coal, a sorbent (usually limestone) is introduced into the bed to absorb a portion of the noxious gases generated as a result of the burning process. By introducing fluidizing air from beneath the burning zone through an air distribution plate or through the furnace floor, the burning coal actually floats above the plate or the floor on a cushion of air as it is consumed. As a result of the enhanced combustion process, greater quantities of heat may be generated. And, as a consequence of the introduction of the sorbent, undesirable pollution levels are substantially reduced.

As a result of the fluidized bed design, it is necessary to distribute the coal-limestone mixture in a uniform manner over the entire cross-sectional area of the bed. Present technology requires that there be one fuel distribution point for each nine square feet of bed area. This means that a boiler rated at a modest 80,000 pounds-steam per hour would require approximately twenty such points. As the rated capacity of the boiler increases, the number of necessary feed points will correspondingly increase.

Some of the present day fluidized bed designs utilize peripheral wall mounted feed nozzles to distribute the fuel and/or sorbent mixture into the bed. As the size of the boiler increases, it may become very difficult to introduce an even fuel distribution over the entire bed surface from wall mounted nozzles.

Other concepts include positioning the feedpipes and/or the fuel nozzles within the bed above the plate or above the furnace floor. Unfortunately, these designs may lead to feeder component erosion, overheating and plugging. Furthermore, the replacement of such units may prove to be difficult as well.

Clearly, in improved fuel feeder design is desirable.

SUMMARY OF THE INVENTION

In contradistinction to the above mentioned feeder designs, the disclosed fuel feeder introduces the granular material vertically upward from beneath the air distribution plate or the furnace floor directly into the base of the fluidized bed at a controlled velocity.

In one embodiment, material is introduced into the bed through a perforated bowl-shaped feed nozzle disposed beneath the air distribution plate. A perforated, horizontal feed member connects the nozzle to a feedpipe via a blanked distributor tee. This blanked design reduces the possibility of solids induced erosion from occurring within the various components. In addition, undesirable backflow which may occur during low or zero power generation periods will be reduced by virtue of the incorporation of the horizontal feed member within the nozzle. Furthermore, the perforations in the nozzle and in the member aid in the fluidization of the bed. By incorporating the nozzle flush with the plate, rather than inserting it within the bed itself, coking and the potential of overheating the port are reduced.

A second embodiment introduces the fuel-sorbent mixture through a blanked T-shaped feed nozzle disposed above the air distribution plate. Enveloping the nozzle, there is disposed a perforated protective housing detachably affixed to the nozzle by a slidable collar. The perforations aid in the fluidization of the bed above the housing while they simultaneously prevent the nozzle from overheating.

A third embodiment is a modification of the second embodiment discussed above. However, the nozzle has been adapted for use in fluidized bed boilers employing water-cooled furnace floors.

BRIEF DESCRIPTION OF THE DRAWINGS

FIG. 3 is an alternate embodiment of the invention.

FIG. 4 is an alternate embodiment of the invention taken along line 4—4 of FIG. 5.

FIG. 5 is a plan view of FIG. 4 partially broken away.

FIG. 6 is a side view viewed along line 6—6 of FIG. 4 partially broken away.

FIG. 7 is an alternate embodiment of the invention taken along line 7—7 of FIG. 8.

FIG. 8 is a plan view of FIG. 7 partially broken away.

FIG. 9 is a sectional side view of FIG. 8 taken along line 9—9.

FIG. 10 is an alternate embodiment of the invention.

BEST MODES FOR CARRYING OUT THE INVENTION

Figure 2:
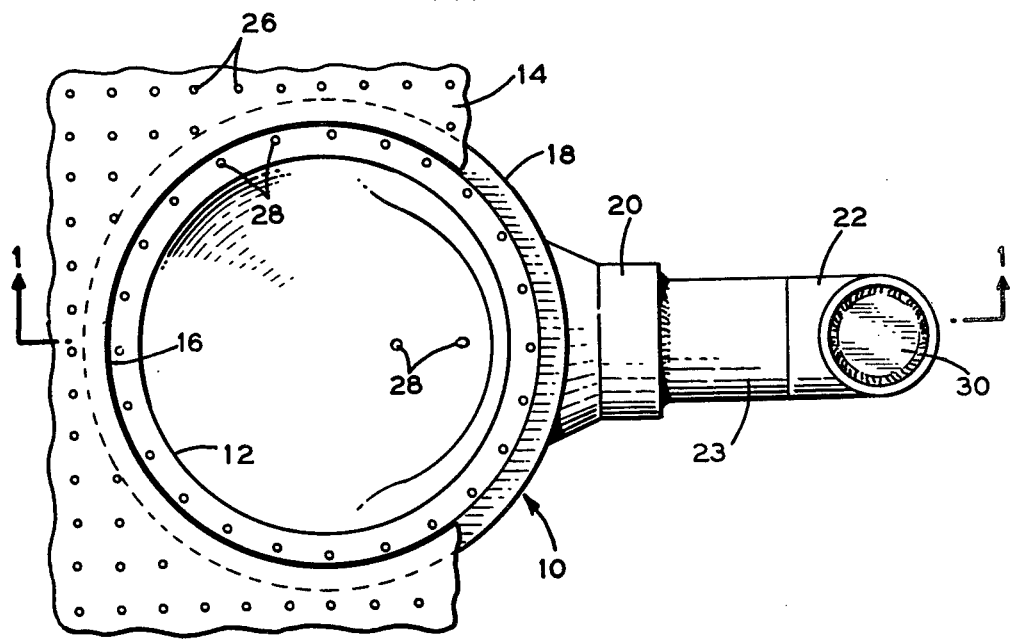
FIG. 2 is a plan view of FIG. 1 partially broken away.
Figure 1:
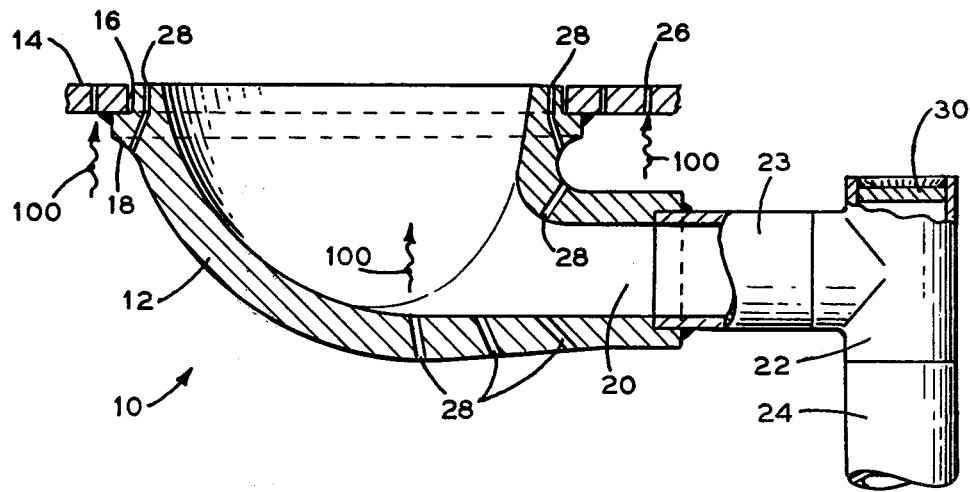
FIG. 1 is a sectional side view of a fuel feeder taken along line 1—1 of FIG. 2.

FIGS. 1 and 2 disclose an embodiment (Embodiment 1) of an underfeed granular fuel feeder 10 employing a bowl-shaped discharge conduit or nozzle 12. Other cavity-shaped nozzles, such as teardrops, ovals and rectangles may be employed as well. The nozzle 12 sealably engages air distribution plate 14 through aperture 16 disposed within the plate 14. Although one aperture 16 is depicted, it should be understood that a fluidized bed boiler will contain a multiplicity of such apertures. The plate 14 contains a plurality of similarly sized vertically oriented first perforations 26. As can be seen from the figures, the apertures 16 are larger than the perforations 26. The nozzle 12 is sealably affixed to the lower portion of the plate 14 by flange 18.

The path of the fluidizing air, supplied by a windbox (not shown) is represented in all the figures by directional arrow 100.

Horizontally disposed feed member 20 projects into the lower portion of nozzle 12. The member 20 is connected to blanked T-shaped distributor 22 via horizontal extension 23, which, in turn, is connected to supply conduit or feedpipe 24. It has been determined that, by employing a shielding plate or blank 30 in the distributor 22, erosion to the tee due to the flowing granulated materials entrained therein may be greatly reduced.

Although the distributor 22 shown is T-shaped, other distributor configurations may be utilized as well. For example, if two nozzles are to be fed from a single feedpipe, the distributor may be in the shape of a blanked cross.

The nozzle 12 and the member 20 contain a plurality of second perforations 28. The necessity of first perforations 26 and second perforations 28 will become evident from the ensuing discussion.

FIG. 3 (Alternate Embodiment 1A) depicts the fuel feeder 10 equipped with a detachable wear-block 32 fastened to the port 12 by fasteners 34. In the event that the granular material stream substantially erodes the block 32, it may be easily replaced from below the distribution plate 14.

FIGS. 4, 5 and 6 disclose an alternate embodiment (Embodiment 2) of the fuel feeder 10. Again, air distribution plate 14 contains first perforations 26 and an aperture 16. However, the granular material is introduced into the base of the fluidized bed by discharge conduit or blanked T-shaped nozzle 36 having legs 38 and 40. Leg 38 further includes reduction 38A. The nozzle 36 is capped by shielding plate or blank 42 and is attached to the supply conduit or feedpipe 24. Leg extensions 48 and 50 may be employed if a longer flow channel is desired. Their use will be explained more fully in the subsequent discussion. Note that the extension 50 includes first offset 52.

Protective housing 54, positioned directly on the plate 14, encloses the nozzle 36. Note that the housing includes two openings 64 and 66 and the upper section 60 contains a plurality of perforations 62.

The nozzle 36 is designed to be replacable by employing sliding collar 68. Note that the collar includes second offset 70.

By breaking tack weld 72, the collar 68 may be slid over the extension 48 and the reduction 38A toward the body of the nozzle 36. This step frees the second offset 70 from the constraining influence of the opening 64. By cutting the feedpipe 24 with a torch, the nozzle may be easily removed by dropping it through the aperture 16. Thus, there is no need to physically enter onto the distributor plate 14 to remove the nozzle 36.

To install a new nozzle, the above recited steps are followed in reverse order. That is, first a suitable collar 68 is slidably fitted about the reduction 38A and the extension 48. The nozzle is then placed within the housing (from beneath the plate 14) so that the first offset 52 is properly positioned within the opening 66. The collar 68 is then slid away from the body of the nozzle 36 so that the second offset 70 is properly positioned within the opening 64. A tack weld 72 is then applied to join the collar 63 to the reduction 38A.

Referring specifically to FIG. 6, note how the housing 54 permits the fluidizing air to pass upwardly through it via perforations 62.

FIGS. 7, 8, 9 and 10 (Alternate Embodiment 3) depict the nozzle 36 mounted above a water-cooled furnace floor 74. Larger sized fluidized bed boilers may require such floors to reduce heat induced furnace expansion and contraction differentials.

The floor 74 consists of a plurality of spaced parallel tubes 76 connected to one another by a series of tube plates or ligaments 78 disposed therebetween. (The designations 76A and 78A shown in the various figures are employed merely to differentiate adjacent tubes and ligaments.) Note that the ligaments 78 and 78A do not fuly extend throughout the floor. Rather, they are purposely gapped to form a plurality of apertures 16 (only one of which is shown) between the tubes. As in Embodiment 2, the nozzle 36 is situated directly over the aperture 16.

The ligaments 78 and 78A include a plurality of perforations 90 to allow the fluidizing air to enter into the bed area above the floor 74. Known means, such as bubble caps (not shown), may be employed to expedite the introduction of the air into the bed.

Although Embodiments 2 and 3 share the same basic design, they, obviously, are mounted differently within the furnaces. Whereas, the housing 54 (as shown in Embodiment 2) is positioned directly upon the distribution plate 14, the housing 54 (as shown in Embodiment 3) is oriented above the floor 74. Compare FIGS. 4 and 7.

Filler bars 80 and 80A disposed between tubes 76 and 76A and attached to ligaments 78 and 78A act as supporting surfaces for support frame 82. The frame 82 is composed of side walls 82A, 82B, 82C and 82D. The housing 54 is, in turn, attached to the frame 82.

In view of the fact that the furnace floor 74 is composed of a plurality of fluid carrying tubes 76, it is undesirable to cut the tubes to remove the housing 54 in the event that the port 36 needs to be replaced. Instead, by mounting the filler bars and support brackets upon the tubes during initial shop fabrication, there will be no need to cut the tubes at a later date to effectuate the removal of a nozzle.

As a further attestation to the versatility of the protective housing-nozzle combination, the nozzle may be rotated and fixed through angle 84 within the housing. See FIG. 10. Although the angular deployment of the nozzle will utlimately depend on the physical layout of the bed, it is contemplated that the angle 84 fall within a range from 0 degrees to about 12 degrees.

This angular nozzle deployment was prompted by the fact that closely spaced co-linear nozzles may interface with each other's fuel distribution pattern. By employing angled nozzles, the feeders may be placed relatively close to each other without the need for staggering them across the bed.

The invention and the manner of applying it may, perhaps, be better understood by a brief discussion of the principles underlying the various embodiments.

As was stated previously, fluidized bed boilers rely on a floating cushion effect that permits more efficient burning of the fuel in suspension. Fluidizing air, usually vertically introduced into the bottom of the furnace through a perforated distribution plate or through the furnace floor, maintains the fluid bed in suspension. A problem, however, develops in the manner of introducing fuel and sorbent to the bed. Wall mounted feeders may not introduce the material evenly into the central portions of the bed. Furthermore, it may be undesirable to place a feedpipe and/or a distribution assembly within the bed itself, since debilitating overheating, coking and plugging may result.

The present invention eliminates these problems while simultaneously introducing a fuel-sorbent mixture directly into the base of the bed from beneath the air distribution plate or the furnace floor.

As was discussed at the outset, large boilers will require a large number of fuel-sorbent entrance points. One contemplated method of feeding this large number of points is to pneumatically transport the material from a remote storage site to the boiler by a multiplicity of flow paths using (non-fluidizing) air as a transport medium. It is contemplated that the granular material flow rate will be approximately 40–50 feet per second. Contrast this with the contemplated bed superficial velocity of about 4–7 feet per second. If the material is permitted to enter the bed at high velocities, some of the particles may be blown out of the bed proper before being afforded the opportunity to mix and react within the bed. Naturally, each individual fluidized bed boiler design will be confronted by its own set of design parameters; however, it should be understood that large material-bed velocity ratios are clearly undesirable. The disclosed embodiments permit the material stream to be decelerated before introduction into the bed.

Embodiments 1 and 1A employ a nozzle 12 having a substantially greater cross sectional flow area than the cross sectional flow area of the feedpipe 24. It is preferred that the nozzle flow area be about sixteen times greater than that of the feedpipe. This orientation will, in turn, substantially reduce the velocity of the material flowing into the bed area. Material flow rates would be reduced from about 50 feet per second to a more desirable 3.1 feet per second. However, this ratio need not be fixed. Obviously, different bed designs will require different sized nozzles and different velocities. It should be understood that high flow rates are necessary to supply a fluidized bed boiler with sufficient fuel. However, when the fuel is actually introduced into the furnace, relatively low velocities are desirable to permit sufficient mixing time and to prevent excessive erosion to the various fuel feeder components resulting from rapid granular material flow rates.

Mention was briefly made regarding the second perforations 28 disposed within the feeder 10. They serve in several capacities. First of all, they aid in the fluidization of the bed by supplying fluidizing air from a windbox (not shown) located below the air distributor plate. Secondly, the perforations allow the fluidizing air to diffuse the granulated material entrained within the nozzle and assist in its introduction into the bed. Thirdly, the fluidizing air will help cool the nozzle during furnace operation. In addition, the perforations will aid in cooling the nozzle after the furnace is shut down since the bed materials will still contain large amounts of residual heat for an appreciable length of time. As a consequence, the life expectancies of the various feeder components will be greatly increased.

Embodiments 2 and 3 encourage an even horizontal scattering of granulated material above the plate or furnace floor transversely to the direction of the fluidizing air stream. This orientation will induce a thorough mixing of the material within the bed while simultaneously reducing debilitating backflow and plugging. Indeed, leg extensions 48 and 50 may be utilized to vary the ultimate flow pattern into the bed.

As in embodiments 1 and 1A, the diameter of the total discharge flow area of the nozzle 36 is a function of the desired final material flow velocity. Tests have indicated that the total nozzle discharge flow area should be about two times greater than that of the feedpipe cross sectional area. This substantially greater total cross sectional flow area will result in substantially reduced material flow velocities.

For example, if the initial flow velocity is 50 feet per second, the final velocity of the material, after passage through the two legged feeder as shown in the figures would be 25 feet per second. However, in contrast to embodiments 1 and 1A, final velocities may be somewhat higher since there is no vertical velocity component to contend with. Again, each set of circumstances will dictate the necessary design parameters.

The protective housing 54 serves a dual function. One, it will maintain the nozzle at a temperature substantially equal to that of the fluidizing air. Otherwise, the temperature of the nozzle would rise to that of the much hotter bed. This undesirable situation would shorten the life of all the fuel feeder components and greatly increase the possibility of coking within the otherwise hotter fuel feeder. Two, the housing allows fluidizing air to cover the area where the feeder is located. This will prevent a hot, dead (unfluidized) area from forming above the feeder.

Although Embodiments 2 and 3 depict two legs 38 and 40, it may be advantageous to employ a single leg. In such a case, in order to reduce the velocity of the granular material, the diameter of the single leg must be larger than the diameter of the feedpipe. Conversely, it may be desirable to increase the number of legs. A greater number of legs would reduce the number of feedpipes. However, the underlying principles previously discussed would apply to these orientations as well.

It should be mentioned that all of the embodiments utilize a blanked construction. Although conventional elbows and tees may be used, it is preferable to employ shielding plates or blanks. Distributor 22 (Embodiments 1 and 1A) includes blank 30 whereas the nozzle 36 (Embodiments 2 and 3) includes blank 42. It has been long known that any flowing granulated stream will eventually erode the piping that contains it. This debilitating process is exacerbated when the stream is forced to change direction as in the case of an elbow or a tee.

However, by employing a blanked construction, as is depicted in the various embodiments, erosion is greatly reduced. It has been determined that the granulated material tends to form a cushioning pocket within the recess adjacent to the blank. This stationary pocket protects the underlying vulnerable pipe surfaces from the eroding action of the flowing stream. As the pocket itself is gradually eroded, new material replaces the worn material. This continuing exhaustion-replenishment cycle extends the life of the various components involved.

Although the above discussion concerns itself with a coal-limestone mixture, it should be understood that the invention is not limited to this particular combination of materials. The discharge connection may be utilized for both single material or multi-material granular streams.

While in accordance with the provisions of the statutes there is illustrated and described herein specific embodiments of the invention, those skilled in the art will understand that changes may be made in the form of the invention covered by the claims, and that certain features of the invention may sometimes be used to advantage without a corresponding use of the other features.

The embodiments of the invention in which an exclusive property or privilege is claimed are defined as follows:

1. In combination with a vapor generator having a furnace fired by a fluidized bed of granular material, perforated plate means for introducing fluidizing air into the furnace, underfeed means for supplying the material through the plate means comprising at least one discharge conduit, at least one material supply conduit, the discharge conduit having one end communicating with the supply conduit and at least one end communicating with the bed, the discharge conduit having a total cross-sectional flow area substantially greater than the cross-sectional flow area of the supply conduit to substantially reduce the velocity of the granular material entering the furnace, the discharge conduit including a nozzle disposed above the plate means, the nozzle having at least one leg arranged to discharge the material into the furnace transversely to the perforations in the plate means, and a perforated housing enclosing the nozzle, the perforations in the housing promoting fluidization of the bed and cooling of the nozzle.

2. The combination according to claim 1 wherein a slidable collar, coaxially disposed about the leg, detachably affixes the nozzle to the housing.

3. The combination according to claim 1 wherein the plate means includes spaced parallel tubes disposed at the bottom of the furnace, perforated ligament members disposed between the tubes and forming a furnace floor therewith, and housing support members attached to the furnace floor for detachably supporting the housing.

* * * * *

UNITED STATES PATENT AND TRADEMARK OFFICE
CERTIFICATE OF CORRECTION

PATENT NO. : 4,203,391
DATED : May 20, 1980
INVENTOR(S) : Paul S. Knoebel & Jerald M. Wennerstrom It is certified that error appears in the above-identified patent and that said Letters Patent are hereby corrected as shown below:

Column 4, line 34; the word --interfere-- should be inserted in place of the word "interface".

Signed and Sealed this

Second Day of September 1980

[SEAL]

Attest:

SIDNEY A. DIAMOND

Attesting Officer

Commissioner of Patents and Trademarks